US008554504B2

United States Patent
Sambongi

(10) Patent No.: US 8,554,504 B2
(45) Date of Patent: Oct. 8, 2013

(54) POSITIONING APPARATUS, POSITIONING METHOD AND STORAGE MEDIUM FOR POSITIONING OF PEDESTRIAN BY AUTONOMOUS NAVIGATION

(75) Inventor: Masao Sambongi, Tokyo (JP)

(73) Assignee: Casio Computer Co., Ltd., Tokyo (JP)

( * ) Notice: Subject to any disclaimer, the term of this patent is extended or adjusted under 35 U.S.C. 154(b) by 182 days.

(21) Appl. No.: 13/278,449

(22) Filed: Oct. 21, 2011

(65) Prior Publication Data

US 2012/0101763 A1    Apr. 26, 2012

(30) Foreign Application Priority Data

Oct. 22, 2010    (JP) ................. 2010-236959

(51) Int. Cl.
*G01C 25/00*    (2006.01)
(52) U.S. Cl.
USPC ............. 702/97; 702/92; 702/96; 702/104; 702/106; 702/150
(58) Field of Classification Search
USPC ..... 702/92, 94–97, 104, 106, 150; 235/78 N; 116/DIG. 43; 73/1.75; 33/431
See application file for complete search history.

(56) References Cited

U.S. PATENT DOCUMENTS

| 5,899,833 A * | 5/1999 | Ryan et al. ..................... 482/52 |
| 6,546,336 B1 | 4/2003 | Matsuoka et al. |
| 6,772,080 B2 * | 8/2004 | Luo ............................... 702/96 |

FOREIGN PATENT DOCUMENTS

JP    2000-097722 A    4/2000

* cited by examiner

*Primary Examiner* — Sujoy Kundu
*Assistant Examiner* — Elias Desta
(74) *Attorney, Agent, or Firm* — Holtz, Holtz, Goodman & Chick, PC

(57) ABSTRACT

Disclosed is a positioning apparatus including: an autonomous navigation sensor which is held by a pedestrian and which outputs periodic oscillation and direction information; a step length data storage section which stores step length data; a movement distance calculating section which calculates movement distance; a traveling direction calculating section which calculates a traveling direction; and a movement direction calculating section which calculates a movement direction for each step, wherein the movement distance calculating section includes a taken step angle calculating section which calculates a taken step angle from the movement direction for each step with respect to the traveling direction; and the movement distance calculating section corrects a value of the step length data so that the step length is larger as the taken step angle becomes larger to calculate a movement distance for each step.

11 Claims, 7 Drawing Sheets

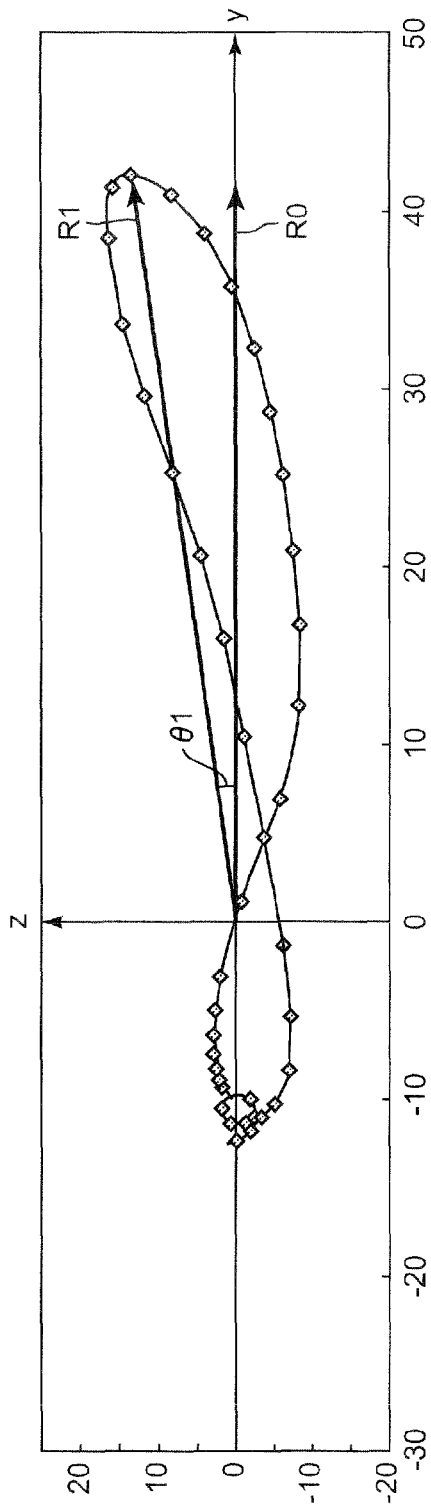
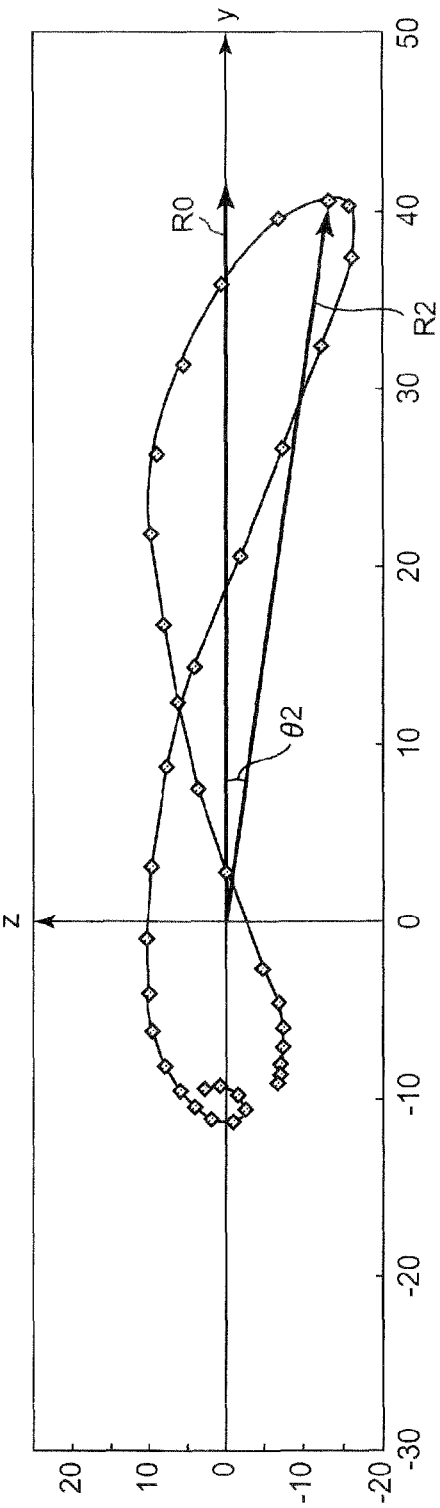
FIG. 4A
FIG. 4B

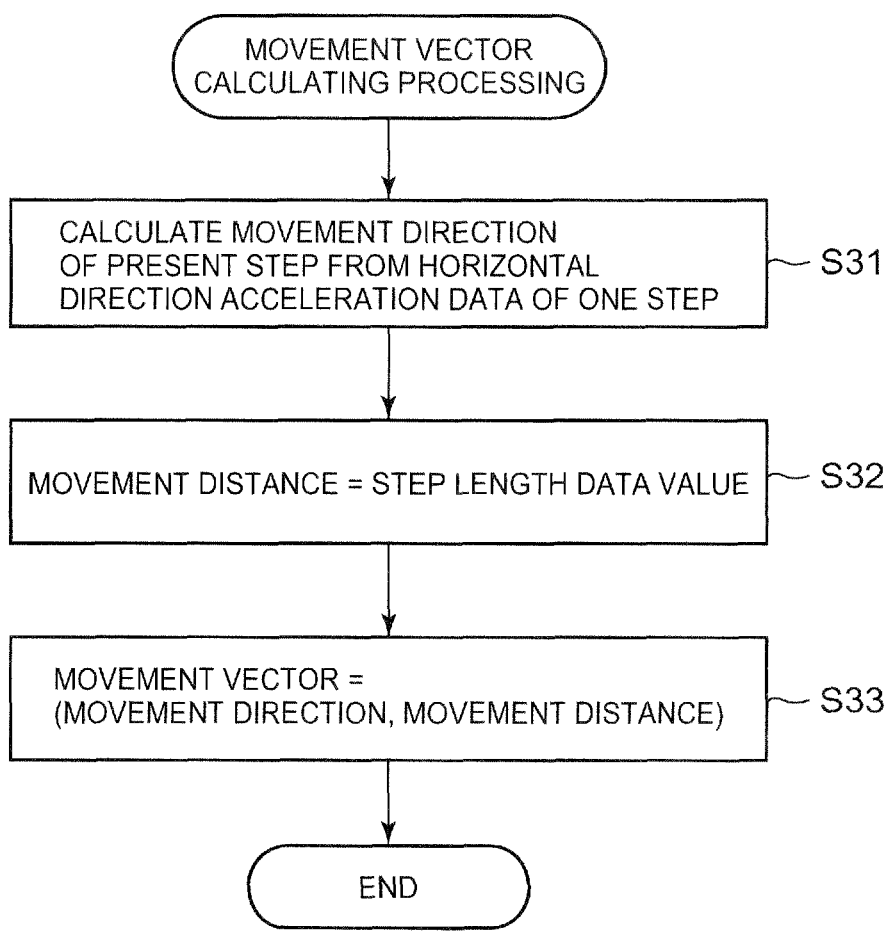

POSITIONING APPARATUS, POSITIONING METHOD AND STORAGE MEDIUM FOR POSITIONING OF PEDESTRIAN BY AUTONOMOUS NAVIGATION

BACKGROUND OF THE INVENTION

1. Field of the Invention

The present invention relates to a positioning apparatus, positioning method and storage medium for positioning of pedestrian by autonomous navigation.

2. Description of the Related Art

There has been a positioning apparatus which performs positioning of a pedestrian by autonomous navigation.

In such positioning apparatus, typically, up and down movement of walking is detected to count a number of steps, and the number of steps is multiplied by a step length set in advance to calculate movement distance.

Then, the movement direction is calculated from the output of the geomagnetic sensor and acceleration sensor, and the movement vector including the movement direction corresponding to the above movement distance is added to the position data of the reference position to measure the position of the pedestrian.

Typically, a value suitable for the pedestrian is set by the following measuring processing as the step length data used in positioning of the autonomous navigation.

In other words, the pedestrian moves straight between two arbitrary points and the number of steps taken in between is counted.

Then, the distance between the two points is divided by the number of steps and the calculated value is set as the step length data.

The conventional technique related to the present invention is described in Japanese Patent Application Laid-Open Publication No. 2000-97722.

The above technique discloses correcting the step length according to the walking state such as time of one step, amount of acceleration when the foot takes the step, etc., in an apparatus which performs positioning of the pedestrian to enhance positioning accuracy by autonomous navigation.

SUMMARY OF THE INVENTION

The present invention has been made in consideration of the above situation, and one of the main objects is to preferably follow movement of a pedestrian and to perform positioning highly accurately by suitably correcting error of movement distance when positioning of a pedestrian is performed for each step by autonomous navigation.

In order to achieve any one of the above advantages, according to an aspect of the present invention, there is provided a positioning apparatus including:

an autonomous navigation sensor which is held by a pedestrian and which outputs periodic oscillation accompanied by movement of the pedestrian and direction information;

a step length data storage section which stores step length data of the pedestrian;

a movement distance calculating section which calculates movement distance of the pedestrian based on the periodic oscillation and the step length data;

a traveling direction calculating section which calculates a traveling direction of the pedestrian based on an average oscillation direction of the periodic oscillation and the direction information; and a movement direction calculating section which calculates a movement direction for each step due to difference of direction of a step taken by a left foot and a right foot of the pedestrian, based on the periodic oscillation and the direction information, wherein the movement distance calculating section includes a taken step angle calculating section which calculates a taken step angle from the movement direction for each step calculated by the movement direction calculating section with respect to the traveling direction calculated by the traveling direction calculating section;

and the movement distance calculating section corrects a value of the step length data so that the step length is larger as the taken step angle becomes larger to calculate a movement distance for each step.

According to an aspect of the present invention, there is provided a positioning apparatus including:

an autonomous navigation sensor which is held by a pedestrian and which outputs periodic oscillation accompanied by movement of the pedestrian and direction information;

a satellite positioning section which performs positioning by receiving a signal from a positioning satellite;

a step length calculating section which performs measurement of the periodic oscillation while the pedestrian moves between two points where positioning is performed by the satellite positioning section and which calculates a step length of the pedestrian based on position data of the two points and the measurement result;

a step length data storage section which stores step length data calculated by the step length calculating section; and an autonomous navigation positioning section which calculates movement direction for each step due to difference of direction of a step taken by a left and a right foot of the pedestrian based on the periodic oscillation and the direction information and calculates movement distance of the pedestrian based on the periodic oscillation and the step length data to perform positioning based on the calculated movement direction and the calculated movement distance, wherein the step length calculating section includes a taken step angle calculating section which calculates a traveling direction of the pedestrian based on the average oscillation direction of the periodic oscillation and the direction information and calculates a taken step angle from a movement direction for each step with respect to the traveling direction; and the step length calculating section calculates the step length for each step along a path as movement along a path bent in a zigzag shape according to the taken step angle between the two points.

According to an aspect of the present invention, there is provided a positioning method to perform positioning of a pedestrian using an autonomous navigation sensor which is held by the pedestrian and which outputs periodic oscillation accompanied by movement of the pedestrian and direction information; and a step length data storage section which stores step length data of the pedestrian, the method including:

movement distance calculating which calculates movement distance of the pedestrian based on the periodic oscillation and the step length data;

traveling direction calculating which calculates a traveling direction of the pedestrian based on an average oscillation direction of the periodic oscillation and the direction information; and movement direction calculating which calculates a movement direction for each step due to difference of direction of a step taken by a left foot and a right foot of the pedestrian, based on the periodic oscillation and the direction information, wherein the movement distance calculating includes taken step angle calculating which calculates a taken step angle from the movement direction for each step with respect to the traveling direction;

and the movement distance calculating corrects a value of the step length data so that the step length is larger as the taken step angle becomes larger to calculate a movement distance for each step.

According to an aspect of the present invention, there is provided a positioning method to perform positioning of a pedestrian by autonomous navigation using an autonomous navigation sensor which is held by the pedestrian and which outputs periodic oscillation accompanied by movement of the pedestrian and direction information; and a satellite positioning section which performs positioning by receiving a signal from a positioning satellite, the method including:

step length calculating which performs measurement of the periodic oscillation while the pedestrian moves between two points where positioning is performed by the satellite positioning section and which calculates a step length of the pedestrian based on position data of the two points and the measurement result;

step length data storage which stores step length data calculated by the step length calculating; and autonomous navigation positioning which calculates movement direction for each step due to difference of direction of a step taken by a left and a right foot of a pedestrian based on the periodic oscillation and the direction information and calculates movement distance of the pedestrian based on the periodic oscillation and the step length data to perform positioning based on the calculated movement direction and the calculated movement distance, wherein the step length calculating includes taken step angle calculating which calculates a traveling direction of the pedestrian based on the average oscillation direction of the periodic oscillation and the direction information and calculates a taken step angle from a movement direction for each step with respect to the traveling direction; and the step length calculating calculates the step length for each step along a path as movement along a path bent in a zigzag shape according to the taken step angle between the two points.

According to an aspect of the present invention, there is provided a storage medium embodying a program to allow a computer connected to an autonomous navigation sensor which is held by a pedestrian and which outputs periodic oscillation accompanied by movement of the pedestrian and direction information; and a step length data storage section which stores step length data of the pedestrian to perform the following functions of:

movement distance calculating which calculates movement distance of the pedestrian based on the periodic oscillation and the step length data;

traveling direction calculating which calculates a traveling direction of the pedestrian based on an average oscillation direction of the periodic oscillation and the direction information; and movement direction calculating which calculates a movement direction for each step due to difference of direction of a step taken by a left foot and a right foot of the pedestrian, based on the periodic oscillation and the direction information, wherein the movement distance calculating includes taken step angle calculating which calculates a taken step angle from the movement direction for each step with respect to the traveling direction;

and the movement distance calculating corrects a value of the step length data so that the step length is larger as the taken step angle becomes larger to calculate a movement distance for each step.

According to an aspect of the present invention, there is provided a storage medium embodying a program to allow a computer connected to an autonomous navigation sensor which is held by a pedestrian and which outputs periodic oscillation accompanied by movement of the pedestrian and direction information; and a satellite positioning section which performs positioning by receiving a signal from a positioning satellite to perform the following functions of:

step length calculating which performs measurement of the periodic oscillation while the pedestrian moves between two points where positioning is performed by the satellite positioning section and which calculates a step length of the pedestrian based on position data of the two points and the measurement result;

step length data storage which stores step length data calculated by the step length calculating; and autonomous navigation positioning which calculates movement direction for each step due to difference of direction of a step taken by a left and a right foot of the pedestrian based on the periodic oscillation and the direction information and calculates movement distance of the pedestrian based on the periodic oscillation and the step length data to perform positioning based on the calculated movement direction and the calculated movement distance, wherein the step length calculating includes taken step angle calculating which calculates a traveling direction of the pedestrian based on the average oscillation direction of the periodic oscillation and the direction information and calculates a taken step angle from a movement direction for each step with respect to the traveling direction; and the step length calculating calculates the step length for each step along a path as movement along a path bent in a zigzag shape according to the taken step angle between the two points.

BRIEF DESCRIPTION OF THE DRAWINGS

The present invention and the above-described objects, features and advantages thereof will become more fully understood from the following detailed description with the accompanying drawings and wherein;

FIG. 4A is a diagram explaining a method of calculating a movement direction for each step;

FIG. 4B is a diagram explaining a method of calculating a movement direction for each step;

FIG. 8 is a flowchart showing a process of movement vector calculating processing of the second embodiment.

DETAILED DESCRIPTION OF THE INVENTION

Preferred embodiments for carrying out the present embodiment are described in detail with reference to the attached drawings. However, the scope of the invention is not limited to the embodiments and the illustrated examples.

First Embodiment

Figure 1:
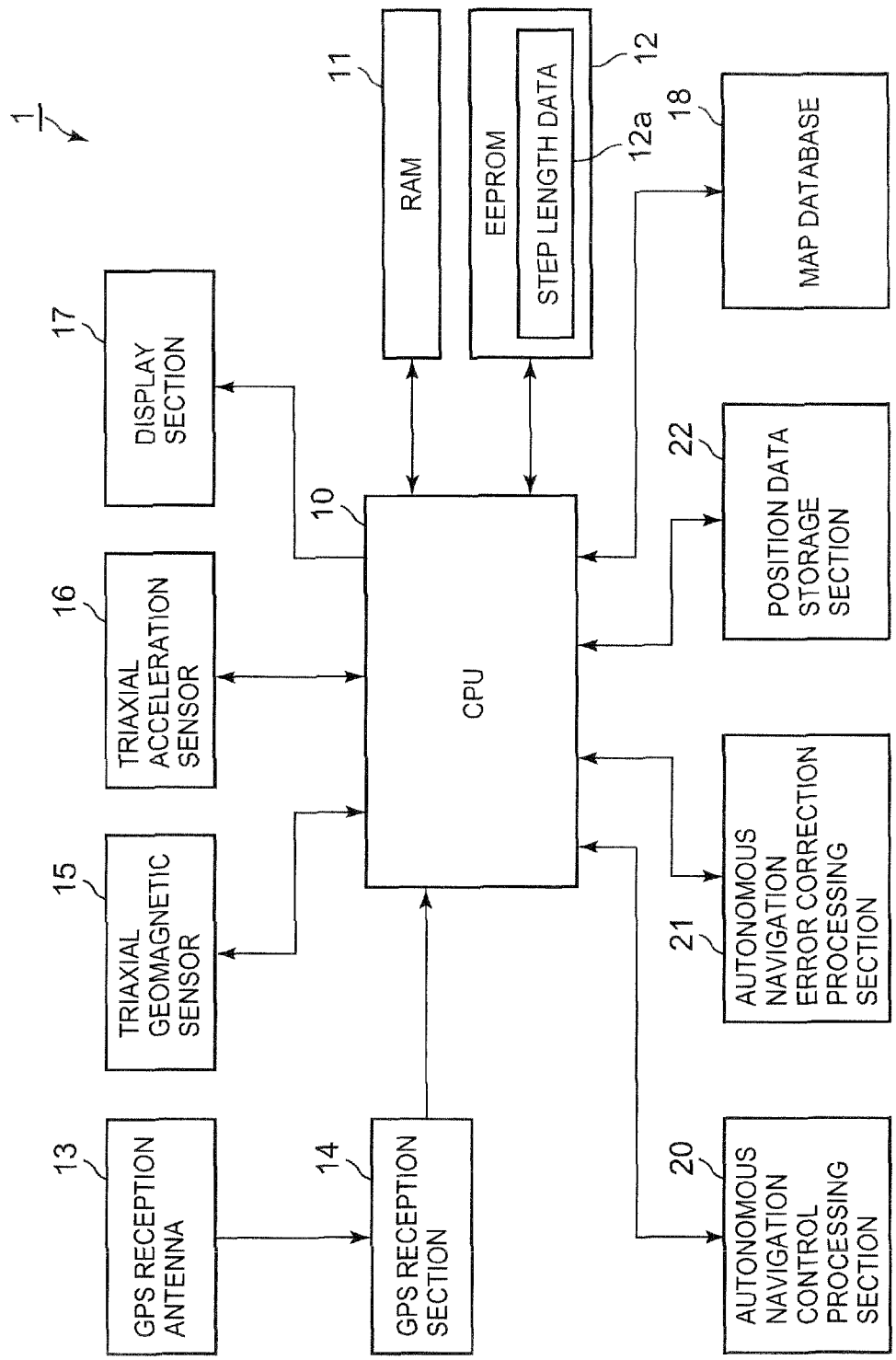
FIG. 1 is a block diagram showing an entire configuration of a positioning apparatus of the first embodiment of the present invention.

FIG. 1 is a block diagram showing an entire configuration of a positioning apparatus of the first embodiment of the present invention.

The positioning apparatus 1 held by a pedestrian performs positioning of each point where the pedestrian moves and also stores position data of each point as history.

The positioning apparatus 1 is an apparatus which displays the present point in real time on a map.

The positioning apparatus 1 includes a triaxial geomagnetic sensor 15 and triaxial acceleration sensor 16 which are autonomous navigation sensors, GPS receiving antenna 13 which receives a signal from a GPS (global positioning system) satellite, GPS receiving section 14 as a satellite positioning section which demodulates a signal received from the GPS satellite and performs positioning calculation of the present position, a display section 17 which performs image display, a CPU (Central Processing Unit) 10 which performs total control of the apparatus, a RAM (Random Access Memory) 11 which provides a memory space for work in the CPU 10, an EEPROM (Electrically Erasable Programmable Read Only Memory) 12 which stores a control program performed by the CPU 10 and control data, an autonomous navigation control processing section 20 which calculates the movement direction and the movement distance based on the output of the autonomous navigation sensor to obtain position data, an autonomous navigation error correction processing section 21 which corrects a string of position data obtained in the past by positioning of the autonomous navigation based on positioning results of the GPS, a position data storage section 22 which stores the position data of the positioning result in a time line, a map database 18 which stores data of a map image of various areas, and the like.

Among the above configuration, the CPU 10 and the autonomous navigation control processing section 20 composes a computer which performs the program.

The GPS receiving section 14 receives a signal of the GPS satellite according to a positioning instruction from the CPU 10.

The GPS receiving section 14 performs a predetermined positioning calculation to calculate position data of the present point.

The GPS receiving section 14 sends the calculated position data to the CPU 10.

The triaxial geomagnetic sensor 15 is a sensor which detects size of geomagnetism in triaxial directions which are orthogonal to each other.

The triaxial acceleration sensor 16 is a sensor which detects acceleration in triaxial directions which are orthogonal to each other.

The sensor signal of the triaxial geomagnetic sensor 15 and the triaxial acceleration sensor 16 is sent to the autonomous navigation control processing section 20 through the CPU 10 after conversion from an analog signal to a digital signal.

The autonomous navigation control processing section 20 is an arithmetic circuit to assist the CPU 10.

The autonomous navigation control processing section 20 calculates position data from the movement direction and movement distance for each walking movement of one step of the pedestrian based on the measurement data of the triaxial geomagnetic sensor 15 and the triaxial acceleration sensor 16 and the step length data set in advance.

The specific method of calculation of the movement direction and the movement distance is described later.

The autonomous navigation error correction processing section 21 is an arithmetic circuit to assist the CPU 10.

The autonomous navigation error correction processing section 21 corrects the string of position data obtained by positioning of the autonomous navigation based on the accurate position data of the GPS when intermittent positioning is performed by the GPS.

Specifically, when accurate position data of point A and point B are obtained by the GPS and a string of position data is obtained by positioning of the autonomous navigation when moving from point A to point B, correction is performed by enlarging or reducing or rotating the movement route entirely so that the starting edge and the end edge of the movement route connecting the string of position data match the position data of point A and point B which are the positioning result of the GPS.

According to such correction, the string of position data obtained by positioning of the autonomous navigation can be corrected to position data in which error is small as a whole.

The EEPROM 12 stores a total positioning processing program which repeatedly performs successive positioning by autonomous navigation and intermittent positioning by GPS as one of the control programs.

The EEPROM 12 also functions as a step length data storage section, which stores step length data 12a represents step length of the user.

[Calculating Method of Step Length Data]

Figure 2:
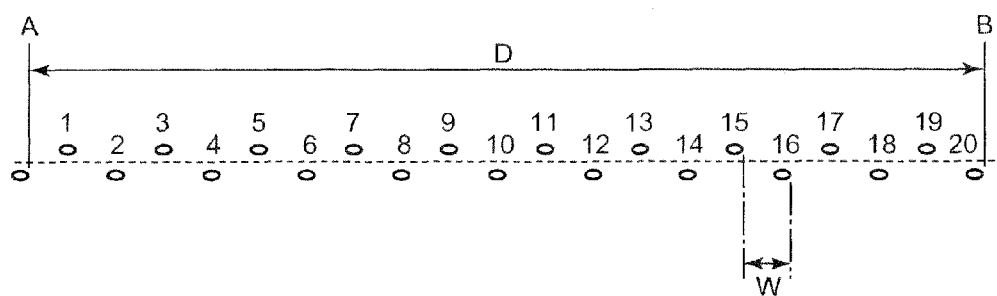
FIG. 2 is a diagram explaining a calculating method of step length data of the first embodiment.

FIG. 2 shows a diagram which explains a calculating method of step length data of the first embodiment.

The ellipse mark shown in the figure represents a trail of each step of the user.

In the present embodiment, the step length data 12a is calculated by the following method and stored in the EEPROM 12.

In other words, as described in FIG. 2, first accurate position data of point A and point B is obtained by the GPS and the user moves straight between point A and point B.

In this case, the CPU 10 calculates the distance D between points A and B based on the positioning result of the GPS.

Then, the CPU 10 calculates the number of steps N (20 steps in FIG. 2) of the user between points A and B from the calculated result of the autonomous navigation control processing section 20 and calculates the step length W by the following formula (1).

$$W=D/N \qquad (1)$$

When the straight movement as described above is obtained in the positioning processing, or when the above described straight movement is performed by the user upon request in the setting processing, the CPU 10 performs the above described calculating processing of the step length W.

Then, the CPU 10 stores the step length data 12a which represents the step length W in the EEPROM 12.

[Description of Phenomenon where Movement Distance is Measured Short]

Here, the description of the phenomenon where the total movement distance is measured short when positioning is performed for each step by autonomous navigation using the step length data 12a obtained as described above is shown.

Figure 3:
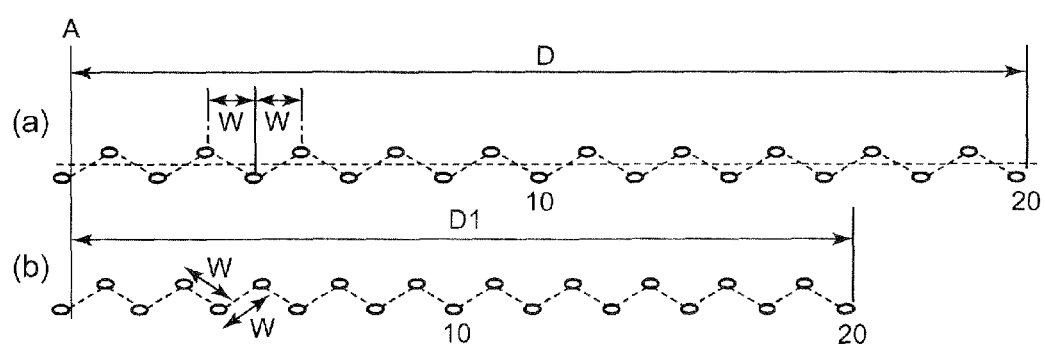
FIG. 3 is a diagram explaining a phenomenon where the total movement distance is measured short when positioning is performed for each step without correcting step length data.

FIG. 3 is a diagram explaining a phenomenon where the total movement distance is measured short when positioning is performed by autonomous navigation using the step length data 12a.

FIG. 3 (a) shows the actual movement.

FIG. 3 (b) shows the movement represented by the positioning result of autonomous navigation.

The ellipse mark shown in FIG. 3 represents a trail of each step of the user.

As shown in FIGS. 3 (a) and (b), an angular difference occurs in the movement direction depending on the difference of direction the left and the right foot of the user takes even when moving straight.

Therefore, as shown with a dotted line in FIGS. 3 (a) and (b), when the positioning of the autonomous navigation is performed for each step, a positioning result as if the user is moving in a zigzag manner for each step is obtained even if the user is moving straight due to the angular difference of the movement direction.

When the positioning of the autonomous navigation is performed with the movement distance for each step as step length W, the positioning result as shown in FIG. 3 (b) is obtained.

However, the value (step length W) of step length data 12a set in the EEPROM 12 corresponds to the movement distance "W" for each step along the straight direction as shown in FIG. 3 (a).

Therefore, it can be understood from comparison between the actual movement pattern shown in FIG. 3 (a) and the movement pattern represented by the positioning result shown in FIG. 3 (b) that since the movement path is obtained in a zigzag manner, the total movement distance D1 is measured shorter than the actual movement distance D.

[Calculating Method of Movement Vector]

FIG. 4A and FIG. 4B show a diagram explaining a method of calculating a movement direction for each step in the positioning apparatus 1 of the first embodiment.

Figure 5:
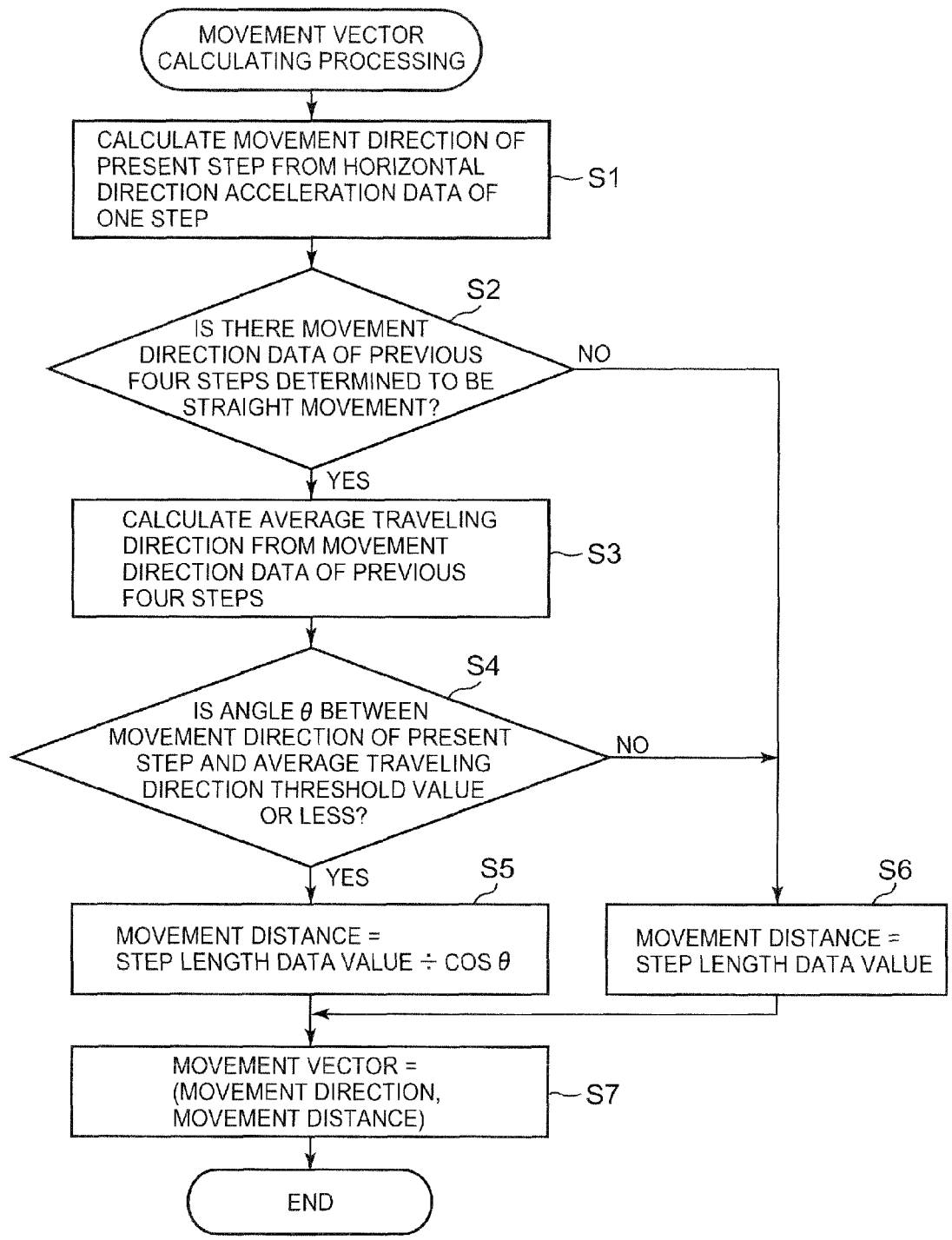
FIG. 5 is a flowchart showing a process of movement vector calculating processing of the first embodiment.

FIG. 5 shows a flowchart of the movement vector calculating processing for each step in the positioning apparatus 1 of the first embodiment.

The graphs shown in FIG. 4A and FIG. 4B plot the acceleration in the horizontal direction among the output of the triaxial acceleration sensor 16 in a time line.

FIG. 4A shows a graph of the acceleration obtained in a movement term of one step where the left foot takes a step.

FIG. 4B shows a graph of the acceleration obtained in a movement term of one step where the right foot takes a step.

The autonomous navigation control processing section 20 of the first embodiment performs the following calculating processing to obtain the movement vector for each step.

First, the autonomous navigation control processing section 20 successively inputs the sensor output of the triaxial acceleration sensor 16 and a gravitational direction is detected from the time average of the sensor output.

Then, the autonomous navigation control processing section 20 separates a vertical direction component and a horizontal direction component of the sensor output.

The autonomous navigation control processing section 20 detects the up and down movement of walking from a vertical direction component of the sensor output and specifies the movement term of each step.

Then, the measurement data of the movement term of one step is extracted with the horizontal direction component from the sensor output based on the above processing.

With this, the measurement data shown in FIG. 4A is obtained when the left foot takes a step.

The measurement data shown in FIG. 4B is obtained when the right foot takes a step.

When such measurement data is obtained, for example, the autonomous navigation control processing section 20 calculates directions R1 and R2 which connect an origin of the horizontal direction component and the plot farthest away from the origin as the movement direction for each step (step S1 shown in FIG. 5: movement direction calculating section). Each direction of the three axes of the triaxial acceleration sensor 16 and each direction of the three axes of the triaxial geomagnetic sensor 15 in the positioning apparatus 1 are corresponded to each other.

Therefore, the movement direction can be converted to an azimuth expression.

The calculating method of the movement direction for each step is not limited to the above described method where the movement direction is to be the direction connecting the origin and the plot farthest from the origin.

For example, the calculating method can be a method where the regression line is obtained from the measurement data of the one step and the direction of the regression line can be obtained as the movement direction.

For example, the calculating method can be a method where acceleration direction when the acceleration of the horizontal direction component is maximum in the term where the acceleration of the vertical direction reduces is to be the movement direction.

For example, the calculating method can be a method where the acceleration direction in which the acceleration of the horizontal direction component of a certain term where the acceleration of the vertical direction reduces is averaged is to be the movement direction.

Next, the autonomous navigation control processing section 20 judges whether the four movement directions calculated as described above in the walking movement of four steps directly before is determined as straight (whether the angle formed between a later described average traveling direction is an angle of a threshold value or less) (step S2).

Then, when there is a movement direction of four steps directly before judged as straight, the autonomous navigation control processing section 20 calculates the average of the movement direction of the four steps and this is to be the average traveling direction (step S3; traveling direction calculating section).

In FIG. 4A and FIG. 4B, R0 shows the average traveling direction.

In FIG. 4A and FIG. 4B, a y axis direction of the triaxial acceleration sensor 16 and the average traveling direction R0 are overlapped, however, the direction changes variously according to the traveling direction of the user.

Next, the autonomous navigation control processing section 20 calculates an angle θ (angle θ1 shown in FIG. 4A and angle θ2 shown in FIG. 4B) formed by the movement direction of the present step (direction R1 in FIG. 4A and direction R2 in FIG. 4B) and the average traveling direction R0 (taken step angle calculating section).

Then, the autonomous navigation control processing section 20 judges whether the angle θ is a threshold value or less (for example 20° or less) (step S4).

This judgment distinguishes whether the angle θ is a taken step angle of the movement direction due to the difference of the direction of the step taken by the left and right foot or a change in angle due to changing the traveling direction.

As a result of the judgment, when it is judged that the angle θ is a threshold value or less and is a taken step angle due to the difference of the direction of the step taken by the foot, a one step movement distance H1 is obtained by the value (step length W) of the step length data 12a and the above taken step angle θ in the following formula (2) (step S5; movement distance calculating section).

The one step movement distance H1 is a step length for each step along zigzag walking.

The value (step length W) of the step length data 12a is a step length of one step calculated by considering the zigzag walking as an averaged straight movement. (see FIG. 2).

$$H1 = W/\cos θ \quad (2)$$

In the judgment processing of step S2, when the data of the movement direction of the four steps directly before is not obtained or any of the movement directions of the four steps directly before is not judged as to be straight, the average traveling direction R0 and the taken step angle θ cannot be obtained. Therefore, the autonomous navigation control processing section 20 considers the movement distance of the present step as the value (step length W) of the step length data 12a (step S6).

In the judgment processing of step S4, when the angle θ formed between the movement direction of the present step and the average traveling direction R0 exceeds the threshold value, the autonomous navigation control processing section 20 judges the angle θ is not a taken step angle and is due to the change of the movement direction. In this case, since the taken step angle is not clear, the autonomous navigation control processing section 20 considers the movement distance of the present step as the value of the step length data 12a (step S6).

Then, the autonomous navigation control processing section 20 generates the movement vector from the movement direction obtained above and the movement distance (step S7).

Then, the autonomous navigation control processing section 20 ends the movement vector calculating processing.

As described above, the value of the step length data 12a is corrected to be long according to the taken step angle θ and the movement distance of one step is calculated. Therefore, according to the positioning apparatus 1, positioning error as described in FIG. 3 where the total movement distance is measured short by the positioning of the autonomous navigation of each step can be reduced.

[Overall Positioning Processing]

Next, the control process of the overall positioning processing performed by the positioning apparatus 1 is described.

Figure 6:
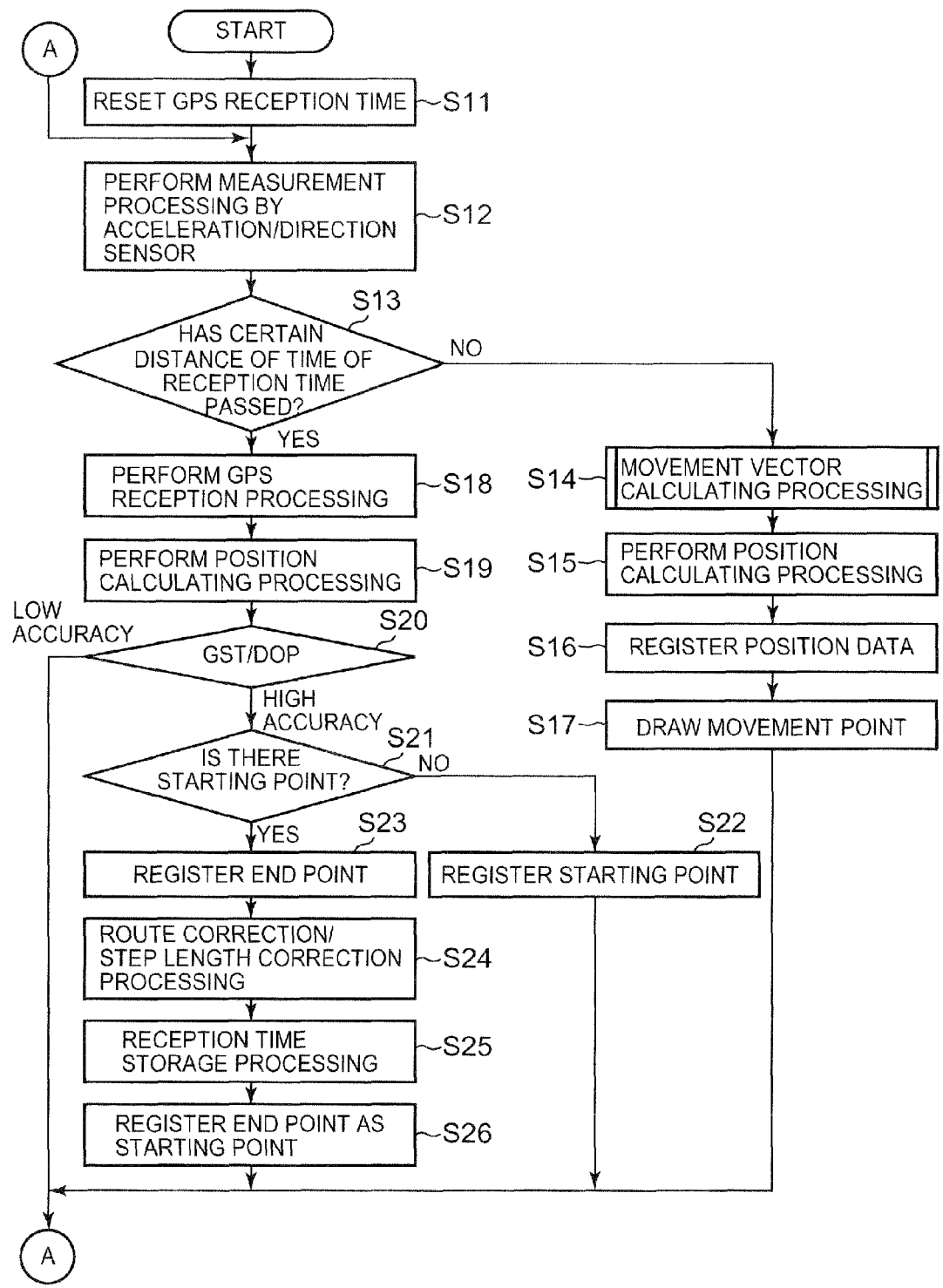
FIG. 6 is a flowchart showing a control process of an overall positioning processing of the first embodiment.

FIG. 6 shows a flowchart of the overall positioning processing.

In the overall positioning processing, the positioning of the autonomous navigation is successively performed and on the other hand, the positioning by intermittent reception by the GPS is performed.

Then, the reference point (starting point) of positioning of the autonomous navigation by positioning by the GPS is set, and the string of position data obtained by positioning of the autonomous navigation is corrected.

When the overall positioning processing starts, first the CPU 10 resets the measured time until the next positioning by the GPS (reception of signal of GPS satellite) is performed (step S11).

The CPU 10 samples the sensor output of the triaxial acceleration sensor 16 and the triaxial geomagnetic sensor 15 and the above is sent to the autonomous navigation control processing section 20 (step S12).

Then, the CPU 10 judges whether the measured time to perform positioning by the GPS (reception of signal of GPS satellite) has passed (step S13).

As a result, when it is not the measured time to perform the positioning by the GPS, the CPU 10 calculates the movement vector of one step of the user by the above movement vector calculating processing performed by the autonomous navigation control processing section 20 (step S14).

Then, the CPU 10 adds the movement vector to the movement data obtained by the previous positioning and calculates the present position data (step S15).

The autonomous navigation positioning section is composed by the above processing of steps S14 and S15.

The CPU 10 receives the present position data from the autonomous navigation control processing section 20 and stores the data in a time line in the position data storage section 22 (step S16).

The CPU 10 performs drawing processing of the content which represents the present position on the map and performs an image display on the display section 17 (step S17).

Then, the processing returns to step S12 again.

In other words, until the intermittent time to perform positioning by the GPS is reached, the processing of steps S12 to S17 are repeated and the positioning by the autonomous navigation is successively performed.

Then, the positioning of the movement point for each step of the user is performed and the change of the movement point is displayed in real time on the map image.

Since the positioning for each step is performed, position data representing change of the traveling direction which suitably follows when the user turns an intersection can be obtained.

The display of the movement point is performed on the map image based on the position data.

In the judgment processing of step S13, when it is judged that the intermittent measured time for performing positioning by the GPS has passed, the processing leaves the loop processing of steps S12 to S17.

Then, the CPU 10 issues an instruction to receive a signal to the GPS reception section 14 and allows the GPS reception section 14 to receive a signal of the GPS satellite (step S18).

Then, the CPU 10 issues a positioning instruction to the GPS reception section 14 and calculates the present position (step S19).

Then, the CPU 10 receives the position data from the GPS reception section 14.

When the position data is received from the GPS reception section 14, then, the CPU 10 reads out accuracy information which represents positioning accuracy of the position data from the GPS reception section 14.

Then, when the position data is calculated by the GPS reception section 14, the CPU 10 judges whether a predetermined level or more of accuracy is obtained (step S20).

Here, accuracy information such as DOP (Dilution of Precision) value or GST (GNSS Pseudo Range Error Statistics) can be applied.

Then, the CPU 10 advances to the next step when the accuracy is a predetermined level or more. When the accuracy is not a predetermined level or more, the CPU 10 does not use the position data of the GPS and returns the processing to step S12.

When the accuracy is a predetermined level or more and the processing advances to the next step, the CPU 10 judges whether or not the positioning by the GPS is the first time and the starting point is already registered (step S21).

Then, when the starting point is not yet registered, the CPU 10 registers the position data obtained by the present positioning by the GPS as the starting point (step S22).

Then, the processing returns to step S12.

When the starting point is already registered, the CPU 10 registers the position data obtained by the present positioning by the GPS as the end point (step S23).

Here, the starting point and the end point correspond to the points where position data is obtained by the positioning by the GPS and the points of the start and the end of the section where movement vector is sequentially added by the successive positioning of the autonomous navigation and the position data is obtained.

After the starting point is registered, the starting point is to be the reference point, and the movement vector calculated by the positioning processing of the autonomous navigation is sequentially added to the position data of the starting point to obtain the string of position data of the positioning of the autonomous navigation.

When the end point is registered, the CPU 10 sends the string of position data from the starting point to the end point stored in the position data storage section 22 to the autonomous navigation error correction processing section 21.

Then, the CPU 10 performs the correction processing of the string of position data (movement route) and if possible, the correction processing of the step length data (step S24).

In the correction processing of the position data among the processing of step S24, the CPU 10 first performs processing of overall enlarging or reducing and rotating of the movement route so that the starting edge and the end edge of the movement route connecting the string of position data in a time line overlaps with the position of the starting point and the end point obtained by the GPS positioning.

Then, the CPU 10 stores the position data of each point of the movement route after correction processing as position data after correction in the position data storage section 22.

The movement route in a zigzag for each step is corrected so that the movement route is represented by a smooth line which passes through the center.

In the correction processing of the step length data among the processing of step S24, the CPU 10 judges whether it is possible to determine that the user moves straight from the starting point to the end point.

Then, when it is possible to determine that the user moves straight, the CPU 10 divides the distance from the starting point to the end point by the number of steps in between and calculates new step length data 12*a*.

Then, the CPU 10 stores the new step length data in the EEPROM 12.

Next, the CPU 10 stores the time the positioning by the GPS is performed and resets the measured time for performing the next positioning by the GPS (step S25).

Then, the CPU 10 reregisters the position data registered as the end point in step S23 as the starting point so that the position data obtained by the positioning by the GPS directly before is to be the next starting point (step S26).

When the starting point is reregistered, the processing returns to step S12.

Then, until the next positioning time by the GPS, the positioning of the autonomous navigation by the loop processing of steps S12 to S17 is repeatedly performed.

As described above, according to the positioning apparatus 1 of the first embodiment, positioning is performed for each step of the walking movement in the positioning of the autonomous navigation and the position data is calculated.

Therefore, even when the user turns an intersection, position data representing the change of the traveling direction suitably following the change can be obtained, and the movement point is displayed on the map image.

When the positioning of the autonomous navigation is performed for each step, conventionally, positioning error such as the total movement distance being shorter than the actual movement distance is included.

According to the positioning apparatus 1 of the first embodiment, the value of the step length data 12*a* is corrected according to the taken step angle $\theta$ of the movement direction and the movement distance of one step can be obtained.

Therefore, the positioning error as described above can be reduced and positioning of the autonomous navigation with high accuracy can be achieved.

Specifically, the step length W is corrected as described above with the formula (2) to obtain the movement distance H1 of one step, and the positioning apparatus 1 can suitably remove the positioning error due to the taken step angle $\theta$ of the movement direction based on the difference of the direction of the step taken by the left and right foot.

According to the positioning apparatus 1 of the first embodiment, the movement direction is obtained by the measurement data of the horizontal direction component of the triaxial acceleration sensor 16.

The taken step angle $\theta$ of the movement direction is obtained by the difference between the average movement direction obtained by averaging the movement direction of a plurality of steps and the movement direction of the present step.

Therefore, the taken step angle $\theta$ of the movement direction can be calculated relatively easily.

According to the positioning apparatus 1 of the first embodiment, the step length data 12*a* is set to a value where the distance between two points is divided by the movement steps when the user moves between two points.

Therefore, the step length can be easily set by methods which are similar to conventional methods.

According to the positioning apparatus 1 of the first embodiment, the position data of the reference point is obtained by positioning by the GPS and the position data which is the positioning result of the autonomous navigation is obtained by adding the movement vector for each step calculated based on the output of the autonomous navigation sensor to the position data.

Therefore, the position data in the absolute coordinate can be obtained by positioning of the autonomous navigation.

Second Embodiment

The positioning apparatus 1 of the second embodiment does not correct the movement distance for each step during positioning of the autonomous navigation considering the taken step angle $\theta$ of the movement direction. Instead, the positioning apparatus 1 of the second embodiment calculates the step length considering the taken step angle $\theta$ when the step length of the user is obtained and the value is set as the step length data 12*a*.

The description of the configuration similar to that of the first embodiment is omitted.

[Calculating Method of Step Length Data]

Figure 7A:
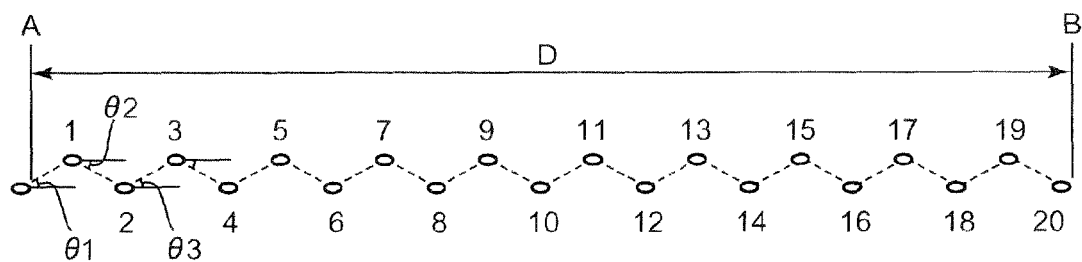
FIG. 7A is a diagram explaining a calculating method of step length data of the second embodiment.
Figure 7B:
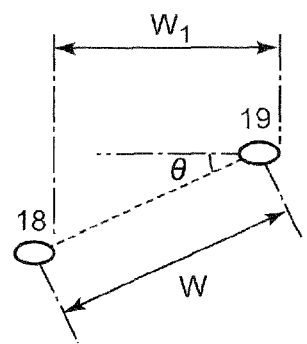
FIG. 7B is a diagram explaining a calculating method of step length data of the second embodiment.

FIG. 7A and FIG. 7B show a diagram explaining the calculating method of the step length data in the second embodiment.

The ellipse mark shown in FIG. 7A and FIG. 7B represents a trail of each step of the user.

In the second embodiment, the step length data 12*a* is calculated as follows and is stored in the EEPROM 12.

In other words, as shown in FIG. 7A, first, accurate position data of point A and point B is obtained by the GPS and the user moves straight between point A and point B.

In the second embodiment, during the above described movement of the user, the taken step angles $\theta1, \theta2, \ldots$ of each step are calculated as performed in the positioning processing of autonomous navigation of the first embodiment.

Then, the average taken step angle θ which is the average value of the above taken step angles θ1, θ2, . . . is obtained.

The above taken step angles θ1, θ2, . . . should be substantially the same angle, therefore, any one of the above can be used as the representative to be set as the average taken step angle θ.

The CPU 10 calculates the distance D between the points A and B based on the positioning result of the GPS.

Then, the CPU 10 calculates the number of steps N (20 steps in FIG. 7A) of the user between points A and B from the calculated result of the autonomous navigation control processing section 20 (step number counting section).

Then, the CPU 10 calculates the step length W with the following formula (3).

$$W = W1/\cos\theta = (D/N)/\cos\theta \quad (3)$$

As shown in FIG. 7B, W1 is the movement distance of one step along the average traveling direction.

W represents the movement distance of one step along a zigzag movement direction.

The CPU 10 stores the step length W as the step length data 12a in the EEPROM 12.

The step length calculating section is composed of the above program to calculate the step length W and the CPU 10.

[Calculating Method of Movement Vector]

FIG. 8 shows a flowchart of movement vector calculating processing of the second embodiment.

In the second embodiment, the step length representing the movement distance along the zigzag movement direction for each step is set in the step length data 12a.

Therefore, the CPU 10 does not need to calculate the taken step angle θ of the movement direction during positioning of the autonomous navigation to correct the step length.

Therefore, similar to the first embodiment, in the movement vector calculating processing of the second embodiment, when the CPU 10 first calculates the movement direction of one step (step S31), the value of the step length data 12a is applied as the movement distance of one step (step S32).

Then, the CPU 10 generates the movement vector from the movement direction and the movement distance (step S33), and the movement vector calculating processing ends.

[Overall Positioning Processing]

In the overall positioning processing, the above described method of calculating the step length data is applied to the processing of correcting the step length data 12a (step S24 shown in FIG. 6; step length calculating section).

Moreover, the above described method is applied to the movement vector calculating processing (step S14 shown in FIG. 6).

Regarding the other processing, positioning processing similar to the first embodiment is realized.

As described above, according to the positioning apparatus 1 of the second embodiment, the step length data 12a is set considering the taken step angle θ of the movement direction for each step due to the difference of the direction of the step taken by the left and right foot.

Therefore, since the movement distance of one step is obtained using the step length data 12a, even when the positioning of the autonomous navigation is performed for each step, the positioning error where the total movement distance is measured short is reduced, and highly accurate positioning of the autonomous navigation is realized.

Specifically, the step length W is obtained by the above described formula (3) according to the taken step angle θ of the movement direction for each step.

Therefore, the movement distance for each step is suitably calculated with the step length W and positioning of the autonomous navigation for each step can be realized with high accuracy.

The present invention is not limited to the above embodiments, and various modifications are possible.

For example, according to the first embodiment, the movement distance of one step is calculated by dividing the value of the step length data with the cosine value of the taken step angle θ, however, the movement distance can be obtained according to other similar functional formulas with which the movement distance can be obtained according to the taken step angle θ.

According to the first embodiment, the step length data is constant, however, the value of the step length data can be changed according to the size of the change of the acceleration in the gravitational direction and the movement distance of one step can be calculated by performing calculation according to the taken step angle θ.

According to the second embodiment, the step length W is obtained by dividing the length W1 of one step along the average traveling direction with the cosine value of the taken step θ, however, the step length can be obtained according to other similar functional formulas with which the step length can be obtained according to the taken step angle θ.

According to the above embodiment, the taken step angle θ for each step is obtained from the difference between the average traveling direction based on the output of the acceleration sensor and the movement direction for each step, however, the taken step angle can be obtained by measuring the rolling movement of the left and the right for each step using a gyroscope.

The details of the embodiment can be suitably changed without leaving the scope of the present invention.

The entire disclosure of Japanese Patent Application No. 2010-236959 filed on Oct. 22, 2010 including specification, claims, drawings and abstract are incorporated herein by reference in its entirety.

Although various exemplary embodiments have been shown and described, the invention is not limited to the embodiments shown. Therefore, the scope of the invention is intended to be limited solely by the scope of the claims that follow.

What is claimed is:

1. A positioning apparatus comprising:
an autonomous navigation sensor which is configured to be held by a walking body and which performs detection regarding walking movement and direction;
a step length data storage section which stores step length data representing a step length of the walking body;
a movement distance calculating section which calculates a movement distance of the walking body based on output of the autonomous navigation sensor and the step length data; and
a movement direction calculating section which calculates a movement direction based on the output of the autonomous navigation sensor;
wherein the movement direction calculating section calculates the movement direction for each step based on the output of the autonomous navigation sensor;
wherein the movement distance calculating section includes a displacement angle calculating section which calculates for each step a displacement angle of the movement direction caused by a difference in stepping direction between a left foot and a right foot based on the output of the autonomous navigation sensor; and wherein the movement distance calculating section corrects a value of the step length data so that the step length is larger as the displacement angle becomes larger to calculate a movement distance for each step.

2. The positioning apparatus according to claim 1, wherein the movement distance calculating section calculates the movement distance for each step according to a relational formula $$D=W/\cos\theta$$

in which the step length indicated by the step length data is W, the displacement angle is θ, and the step length after correction is D.

3. The positioning apparatus according to claim 1, wherein:

the autonomous navigation sensor includes an acceleration sensor which detects acceleration and a geomagnetic sensor which detects geomagnetism; and the displacement angle calculating section calculates an average traveling direction based on a change of acceleration of a plurality of steps in a horizontal direction detected by the acceleration sensor, calculates a movement direction of one step based on a change of acceleration of one step in a horizontal direction detected by the acceleration sensor, and calculates a difference between the average traveling direction and the movement direction of one step as the displacement angle.

4. The positioning apparatus according to claim 1, wherein the step length data is set to a value obtained by dividing a distance between two points by a number of steps necessary for movement between the two points when the walking body moves straight between the two points.

5. The positioning apparatus according to claim 1, further comprising a satellite positioning section which performs positioning by receiving a signal from a positioning satellite, wherein the movement distance calculated by the movement distance calculating section and a movement vector obtained from the movement direction calculated by the movement direction calculating section are added to position data of a reference point obtained by the positioning by the satellite positioning section to perform positioning of each movement point.

6. A positioning apparatus comprising:

an autonomous navigation sensor which is held by a walking body and which performs detection regarding walking movement and direction;

a satellite positioning section which performs positioning by receiving a signal from a positioning satellite;

a step length calculating section which performs measurement regarding walking movement based on output from the autonomous navigation sensor while the walking body moves between two points where positioning is performed by the satellite positioning section, and which calculates a step length of the walking body based on position data of the two points and the measurement result regarding the walking movement;

a step length data storage section which stores step length data representing the step length calculated by the step length calculating section; and an autonomous navigation positioning section which calculates a movement direction for each step based on the output of the autonomous navigation sensor, calculates a movement distance for each step based on the output of the autonomous navigation sensor and the step length data, and performs positioning based on the calculated movement direction and the calculated movement distance;

wherein the step length calculating section includes a displacement angle calculating section which calculates for each step a displacement angle of the movement direction caused by a difference in stepping direction between a left foot and a right foot based on the output of the autonomous navigation sensor; and wherein the step length calculating section calculates the step length for each step along a path as movement along a path bent in a zigzag shape according to the displacement angle, between the two points.

7. The positioning apparatus according to claim 6, wherein the step length calculating section includes a step number counting section which counts a number of steps between the two points based on the output of the autonomous navigation sensor; and wherein the step length calculating section calculates the step length according to a relational formula $$W=(D/N)/\cos\theta,$$

in which a distance between the two points is D, the number of steps is N, the displacement angle is θ, and the step length is W.

8. A positioning method to perform positioning of a walking body using an autonomous navigation sensor which is held by the walking body and which performs detection regarding walking movement and direction, and a step length data storage section which stores step length data representing a step length of the walking body, the method comprising:

calculating a movement distance of the walking body based on output of the autonomous navigation sensor and the step length data; and calculating a movement direction based on the output of the autonomous navigation sensor;

wherein calculating the movement direction comprises calculating the movement direction for each step based on the output of the autonomous navigation sensor;

wherein calculating the movement distance comprises calculating for each step a displacement angle of the movement direction caused by a difference in stepping direction between a left foot and a right foot based on the output of the autonomous navigation sensor; and wherein calculating the movement distance comprises correcting a value of the step length data so that the step length is larger as the displacement angle becomes larger to calculate a movement distance for each step.

9. A positioning method to perform positioning of a walking body by autonomous navigation using an autonomous navigation sensor which is held by the walking body and which performs detection regarding walking movement and direction, and a satellite positioning section which performs positioning by receiving a signal from a positioning satellite, the method comprising:

calculating a step length, which comprises performing measurement regarding walking movement based on output from the autonomous navigation sensor while the walking body moves between two points where positioning is performed by the satellite positioning section, and calculating a step length of the walking body based on position data of the two points and a measurement result regarding the walking movement;

storing in a storage section step length data representing the calculated step length; and performing autonomous navigation positioning, which comprises calculating a movement direction for each step based on the output of the autonomous navigation sensor, calculating a movement distance for each step based on the output of the autonomous navigation sensor and the step length data, and performing positioning based on the calculated movement direction and the calculated movement distance;

wherein calculating the step length comprises calculating for each step a displacement angle of the movement direction caused by a difference in stepping direction between a left foot and a right foot based on the output of the autonomous navigation sensor; and wherein calculating the step length comprises calculating the step length for each step along a path as movement along a path bent in a zigzag shape according to the displacement angle, between the two points.

10. A non-transitory computer-readable storage medium storing a program to control a computer connected to an autonomous navigation sensor which is configured to be held by a walking body and which performs detection regarding walking movement and direction, and a step length data storage section which stores step length data representing a step length of the walking body, the program controlling the computer to perform functions comprising:

calculating a movement distance of the walking body based on output of the autonomous navigation sensor and the step length data; and calculating a movement direction based on the output of the autonomous navigation sensor;

wherein calculating the movement direction comprises calculating the movement direction for each step based on the output of the autonomous navigation sensor;

wherein calculating the movement distance comprises calculating for each step a displacement angle of the movement direction caused by a difference in stepping direction between a left foot and a right foot based on the output of the autonomous navigation sensor; and wherein calculating the movement distance comprises correcting a value of the step length data so that the step length is larger as the displacement angle becomes larger to calculate a movement distance for each step.

11. A non-transitory computer-readable storage medium storing a program to control a computer connected to an autonomous navigation sensor which is configured to be held by a walking body and which performs detection regarding walking movement and direction, and a satellite positioning section which performs positioning by receiving a signal from a positioning satellite, the program controlling the computer to perform functions comprising:

calculating a step length, which comprises performing measurement regarding walking movement based on output from the autonomous navigation sensor while the walking body moves between two points where positioning is performed by the satellite positioning section, and calculating a step length of the walking body based on position data of the two points and a measurement result regarding the walking movement;

storing in a storage section step length data representing the calculated step length; and performing autonomous navigation positioning, which comprises calculating a movement direction for each step based on the output of the autonomous navigation sensor, calculating a movement distance for each step based on the output of the autonomous navigation sensor and the step length data, and performing positioning based on the calculated movement direction and the calculated movement distance;

wherein calculating the step length comprises calculating for each step a displacement angle of the movement direction caused by a difference in stepping direction between a left foot and a right foot based on the output of the autonomous navigation sensor; and wherein calculating the step length comprises calculating the step length for each step along a path as movement along a path bent in a zigzag shape according to the displacement angle, between the two points.

* * * * *